United States Patent [19]

Moss

[11] Patent Number: 5,556,245
[45] Date of Patent: Sep. 17, 1996

[54] TRACTOR MOUNTED LIFTING APPARATUS

[76] Inventor: Billy Moss, 2065 Carters Creek Pike, Franklin, Tenn. 37064

[21] Appl. No.: 353,455

[22] Filed: Dec. 9, 1994

[51] Int. Cl.$^6$ ..................................... B66F 9/04
[52] U.S. Cl. ......................... 414/24.5; 414/920
[58] Field of Search ................ 414/24.5, 24.6, 414/920; 187/226, 251, 252, 253

[56] References Cited

U.S. PATENT DOCUMENTS

| | | | |
|---|---|---|---|
| 4,120,405 | 10/1978 | Jones et al. | 414/24.5 |
| 4,318,653 | 3/1982 | Benefield et al. | 414/24.5 |
| 4,496,031 | 1/1985 | Allen et al. | 187/253 |
| 4,597,703 | 7/1986 | Bartolini | 414/24.5 |
| 4,674,786 | 6/1987 | Lynch | 414/24.5 |
| 5,178,505 | 1/1993 | Smith | 414/24.5 |

FOREIGN PATENT DOCUMENTS

| | | | |
|---|---|---|---|
| 1186286 | 4/1985 | Canada | 414/24.5 |
| 2478610 | 9/1981 | France | 414/24.5 |
| 4142613 | 6/1993 | Germany | 414/24.5 |
| 1548029 | 7/1979 | United Kingdom | 414/24.5 |

OTHER PUBLICATIONS

New Equipment, *Progressive Farmer*, Feb. 1996, p. 44 (Author Unknown).
HFC–42 Westendorf 3–Point Forklift, 1 page brochure by Westendorf Mfg. Co. Inc., Onawa, Iowa, Rev 11181992 dgv.
Whats—New at Westendorf Mfg., 1 page brochure, (undated).
Four Star, Inc., College Grove, TN, Price List, Westendorf Thrifty Lift, Nov. 15, 1995.

*Primary Examiner*—Karen B. Merritt
*Assistant Examiner*—Gregory A. Morse
*Attorney, Agent, or Firm*—Edward Dreyfus

[57] ABSTRACT

A tractor mounted cylindrical hay bale lifter includes a rectangular frame mounted for rotation on the tractor lower arms of the three point hitch. A platform rides up and down the frame side leg guide channels in response to the raising and lowering of the lower arms such that a one foot rise in the platform results in a three foot rise in the platform relative to ground levcel. A spear and studs are mounted on the platform and a hydraulic cylinder connected to the center point controls the angular orientation of the spear and the frame. For jumbo bales, a lift assist cylinder is mounted between the draw bar and the frame to assist the cable lifting system. Lifting is generally vertical to enhance tractor stability. The spear and spear mount is detachable to enable the frame to accommodate other application mounting member.

11 Claims, 9 Drawing Sheets

TRACTOR MOUNTED LIFTING APPARATUS

BACKGROUND

The present invention relates to baled hay lifting apparatus and more particularly to bale lifting apparatus mounted on tractors and cooperating therewith to be driven by the tractor power plant.

Tractors are the workhorses of farms and the like in the United States and many other territories. In recent decades, implements have been designed to operate off of the tractor power plant, thus providing many new power applications to the farmer or rancher.

One such application includes mounting an extendable scissor-like apparatus on the tractor front-end loader or three-point hitch, connecting an hydraulic cylinder to extend and compress the scissor, connecting a spear-type device to the free end of a scissor apparatus and using the mechanism to lift circular bales of hay from ground level on to a flatbed trailer. (See Page 32, *Tennessee Farm Bureau News*, September, 1994). Although somewhat functional, these prior apparatus experience serious structural, operational and safety problems because of the inadequacy of their design. Specifically, it is commonly known that the scissor linkages sometimes give way under the weight of a medium to large bale being lifted. Bales can weigh as much as 1600-2000 pounds and even heavier when wet with absorbed moisture. This giving way can be very dangerous to workers near the flatbed, and of course, to the tractor driver, depending upon the direction the bale falls or moves in an uncontrollable manner. Damage to these linkages requires replacement of the unit with a new one and sometimes the damaged one can not be repaired.

Another problem involves the inability of these scissor units, when mounted on small tractors, to lift the bale sufficiently or high enough to place the bale on the flatbed surface or to place the second layer of bales on to a first layer of bales. This problem arises from the limitation on the height of the lifting capability of these prior art units. In addition, since the scissor must extend the lifted bale forward (rearward of the tractor, to increase lift height), the front tractor wheels tend to leave the ground when large bales are lifted. This reduces tractor stability during the lifting operation.

SUMMARY OF EXEMPLARY EMBODIMENT OF THE PRESENT INVENTION

The present invention provides a lifting apparatus for mounting on and being driven by a tractor which solves or avoids the forgoing problems and provides further benefits described below. An exemplary embodiment according to the principles of the present invention comprises a strong generally vertical frame member mounted on the lower bars of the tractor three-point hitch at the back end of a tractor. A pulley and cable assembly driven by the tractor power plant drives a lifting platform or trolley up and down the frame member. The frame member can be made of channel steel for strength and serves to confine the side platform rollers and can be as high as necessary to place a first or additional layer of bales on a flatbed trailer.

A spear-type lifter is mounted on the moveable platform that includes a center spear and two stabilizing rods or studs spaced above or below and on either side of the spear. The frame member comprises lower horizontal axis pins mounted to the hitch lower bars and its vertical orientation is controlled by a hydraulic cylinder mounted to the tractor third point of the three-point hitch and powered by the tractor engine. Upon approaching a cylindrical bale, the frame is tilted forward from the vertical so that the spear enters the approximate center of the bale-cylinder but at a downward angle. Once the spear is fully inserted, the frame is tilted to or slightly beyond the vertical thus raising the spear to or slightly beyond the horizontal. In this way, the driver is more confident that the bale can not slip off the spear, particularly if the tractor is on a slightly sloping surface.

Once fully seated, the frame member is raised by the three-point hitch causing the cables to raise the platform relative to the frame member to any suitable height for placement on the first or greater level on the flatbed. Once raised to this level, the frame member and platform can be lowered so that the bale is supported by the flatbed. The spear withdraws toward the off or free position as the tractor backs off (moves in the forward tractor direction).

Another feature of the apparatus according to the present invention includes providing an optional hydraulic assist cylinder to augment the lifting capability of the frame member and platform for jumbo bales.

Yet another feature includes mounting the frame on the tractor 3-point hitch so that the operator can move the frame up and down and arrange the cable and pulley assembly so that a 1 foot rise in the hitch results in a multiple (such as 3) foot rise in the spear.

Another aspect of the invention is to provide a new method of lifting hay bales with use of a tractor.

DRAWINGS

Other and further benefits and advantages of the apparatus according to the present invention will become apparent with the following detailed description when taken in view of the appended drawings, in which.

DETAILED DESCRIPTION OF EXEMPLARY EMBODIMENT

Figure 1:
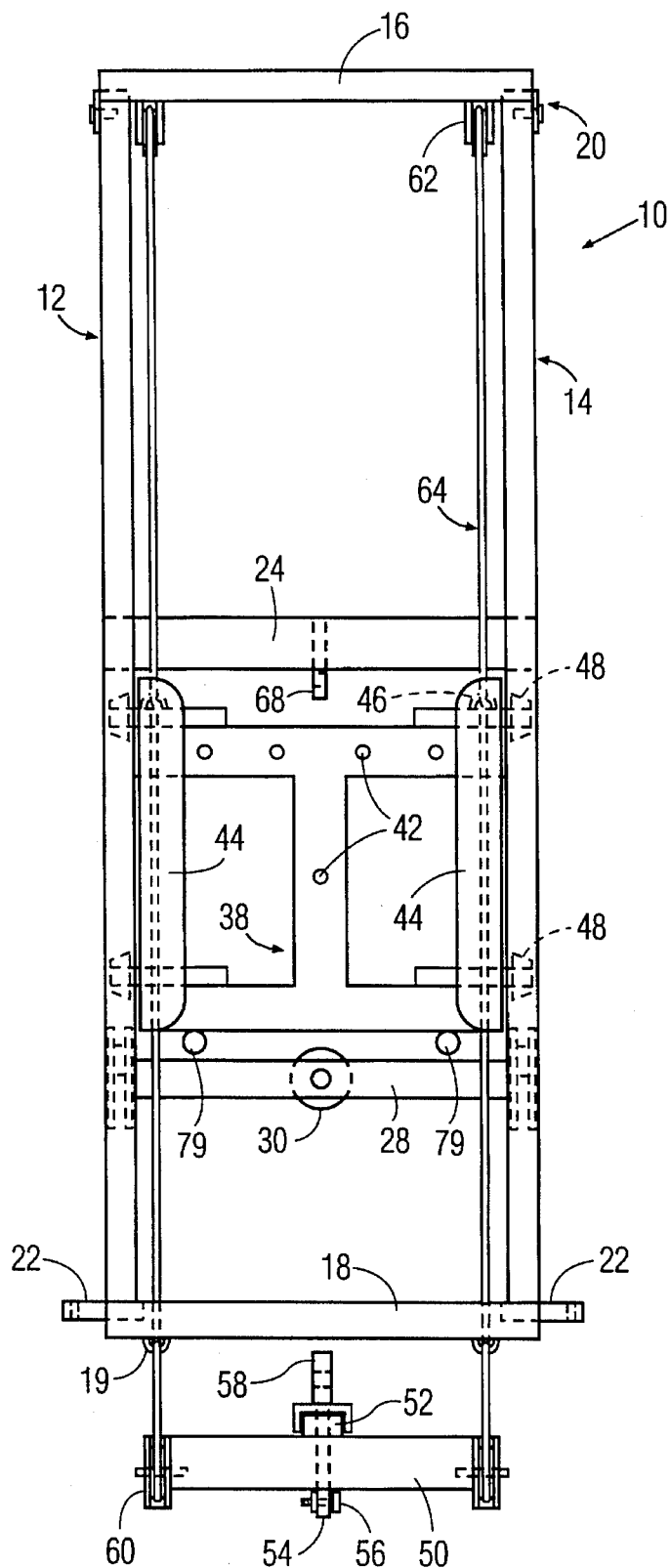
FIG. 1 is a front view (looking at the rearmost part of the frame and pulley mounting bar) assemblies of a lifting apparatus according to the principles of the present invention.
Figure 2:
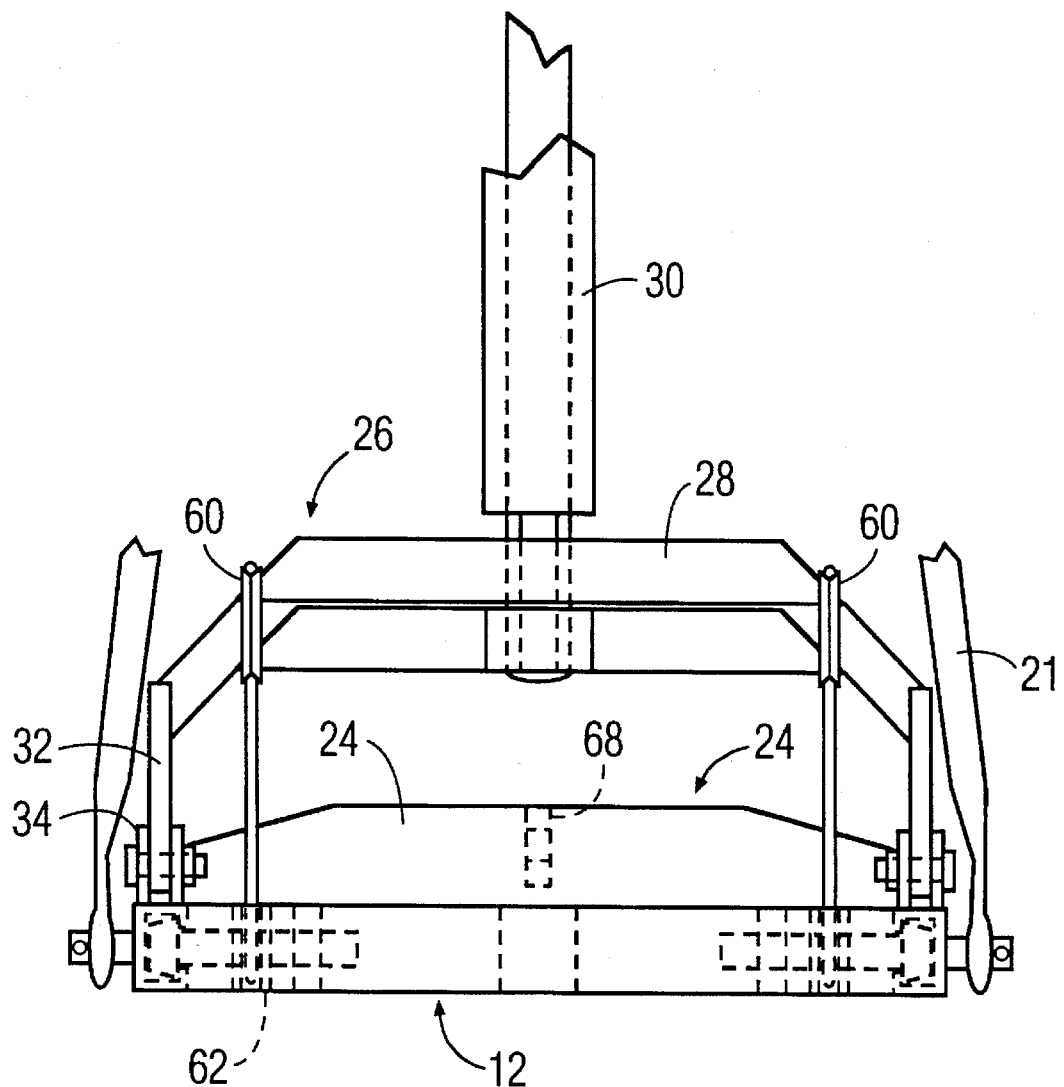
FIG. 2 is a plan view of FIG. 1.
Figure 3:
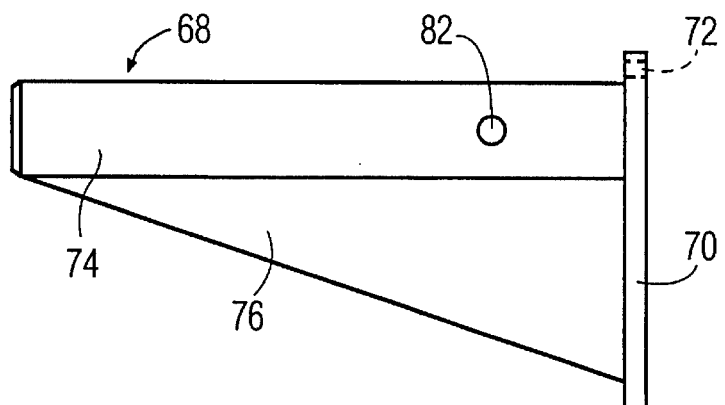
FIG. 3 is a side view of the spear mount.
Figure 4:
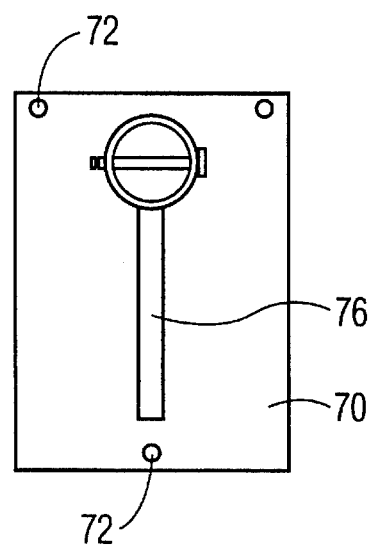
FIG. 4 is a front view of FIG. 3.
Figure 5:
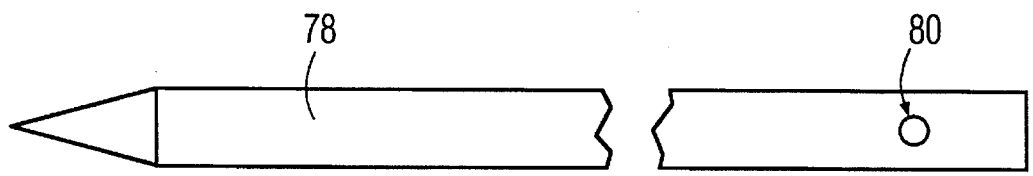
FIG. 5 is a side view of a spear for lifting bales of hay.
Figure 6:
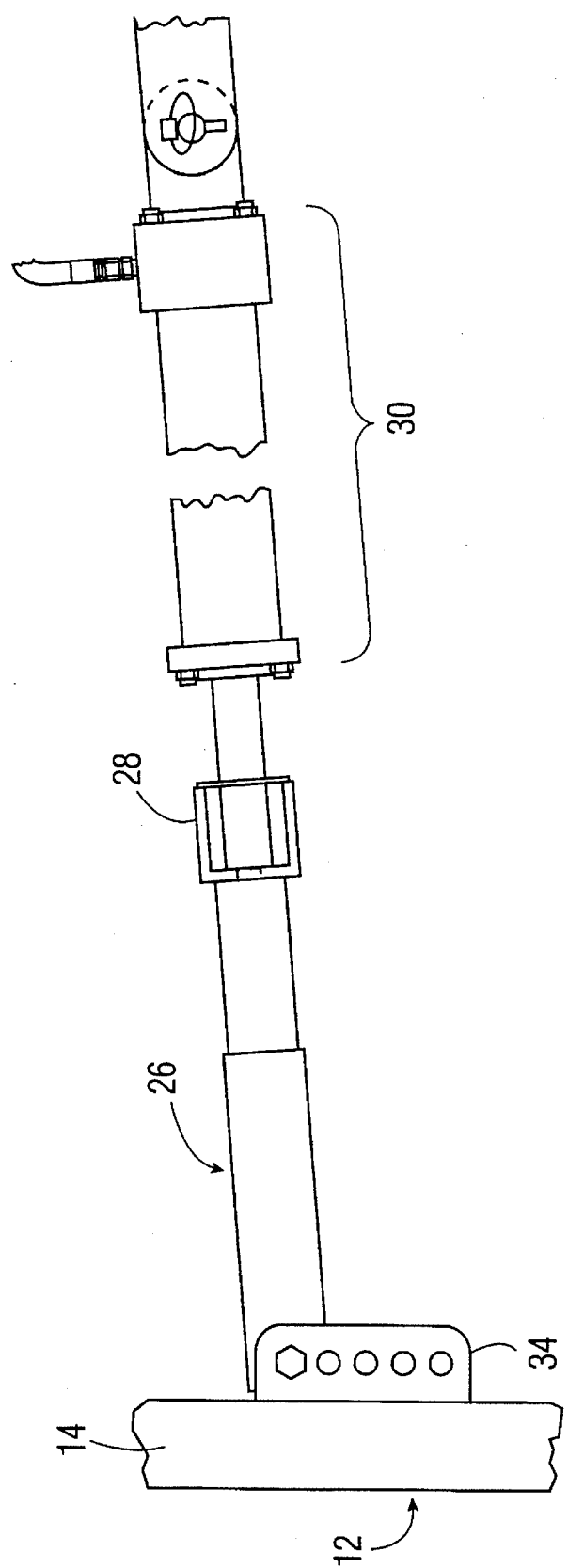
FIG. 6 is a side view of the frame tilt control cylinder and its mountings to the tractor in place of the top link and the frame assembly.
Figure 7:
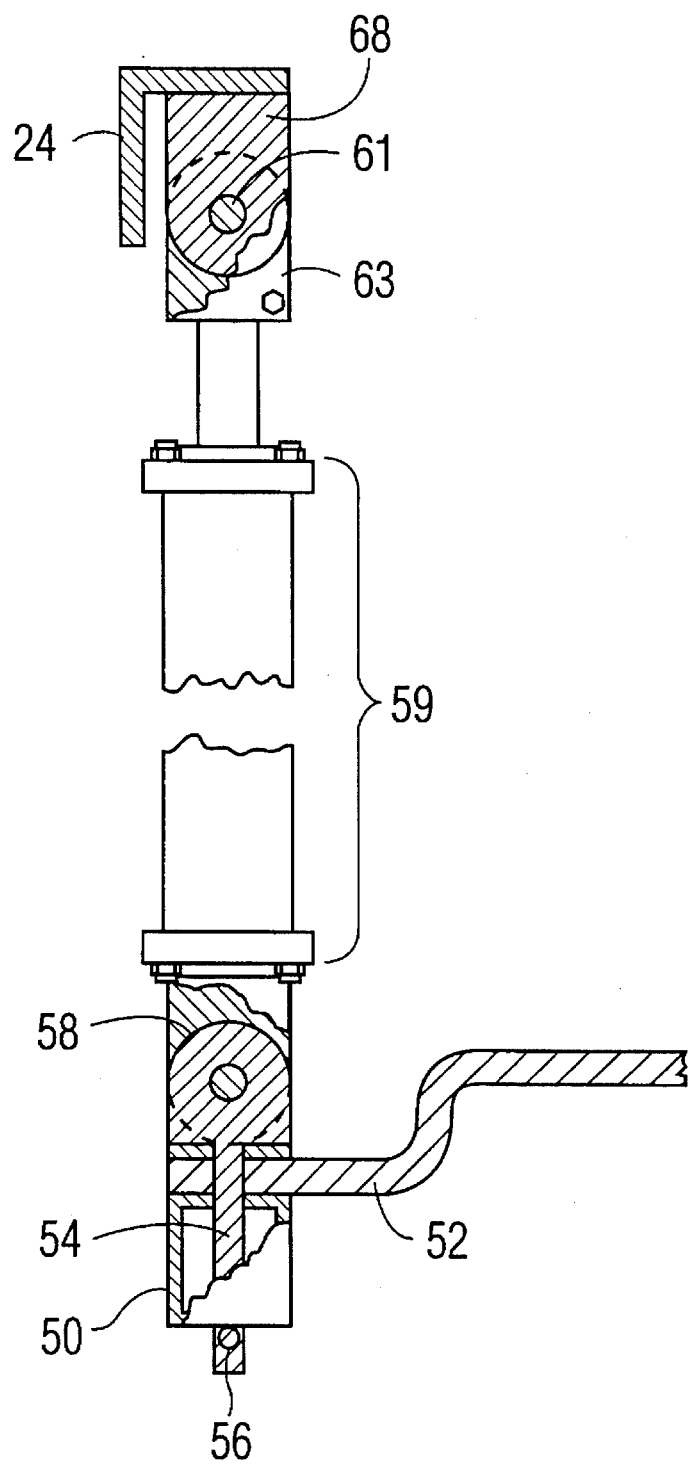
FIG. 7 is a side sectional of the lift assist cylinder and its mountings to the lower draw bar, the lower pulley assembly and the frame assembly.
Figure 8:
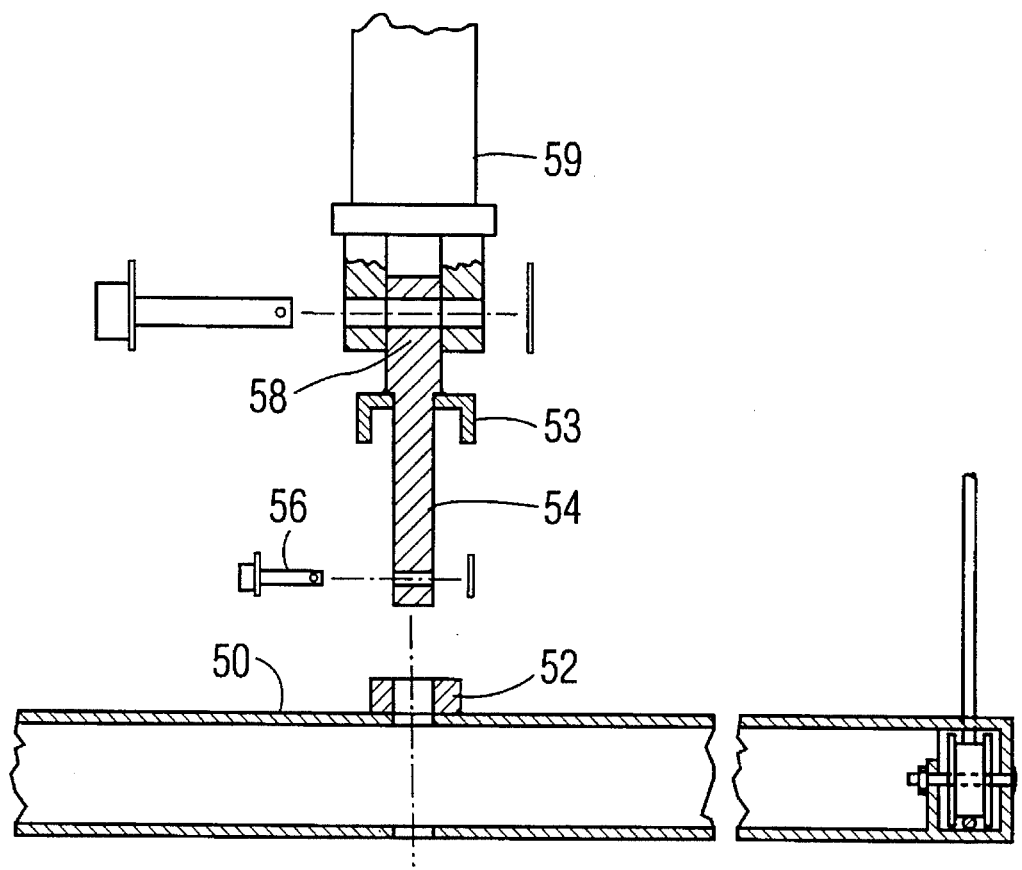
FIG. 8 is an exploded front section of the lower pulley assembly and the lift assist cylinder and its mountings to the lower draw bar and pulley assembly.
Figure 9:
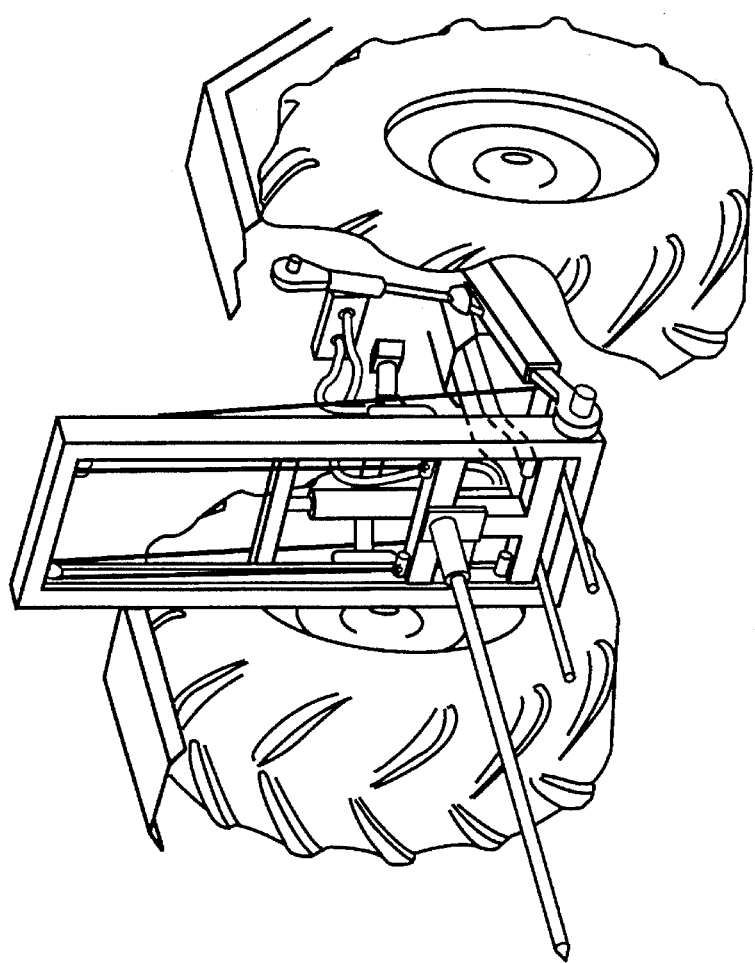
FIG. 9 is a diagrammatic perspective of the embodiment mounted on a tractor and approaching a bale.
Figure 9:
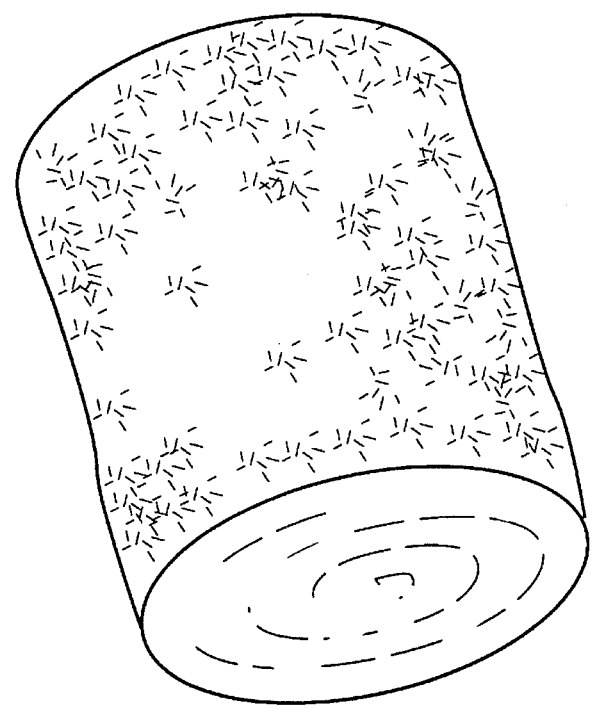
Figure 10:
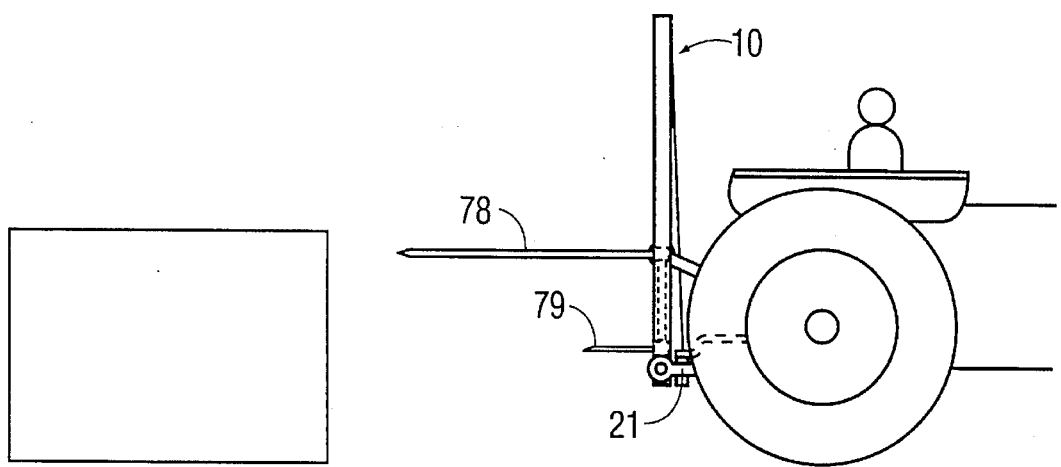
FIGS. 10–14 are schematic drawings showing a method of operation for engaging and lifting a bale.
Figure 11:
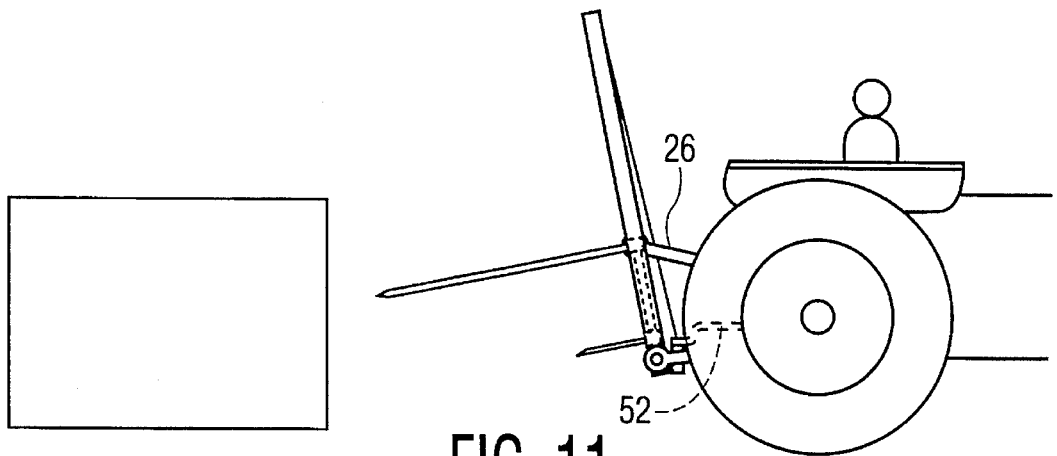

With reference to FIGS. 1 to 8, the bale lifter 10, according to the principles of the present invention, includes a generally rectangular, vertically extending steel frame member 12, that includes two vertical side channel members 14 secured by angle pieces 20 to top tubular member 16 and bottom tubular member 18. Each of the angle pieces 20 has one leg welded to member 16 and the other bolted to the top of member 14 for removal to enable insertion of or withdrawal of platform 38, described below. Pins 22 are welded to the bottom of member 18 for rotational hook-up onto and within lower bars 21 of the tractor standard 3-point hitch at the rear of the tractor. Cable securing eye pieces 19 are welded to the bottom of member 18 in line with the pulleys described below.

Frame member 12 further includes a reinforcing angle member 24 welded to side members 14, slightly above their mid-length. C-shaped member 26 has its outer ends 32 pinned or bolted for rotation in one of the vertically aligned openings of flanges 34 welded to the back side of members 14, generally as shown. Hydraulic cylinder 30 is mounted to the top link tractor mount and has its piston bolted to the center leg 28 of member 26.

Lifter 10 further includes a moveable lifting member or trolley 38 which in this embodiment comprises a lifting frame or platform 40 having an H-frame configuration with openings 42 for mounting the spear-type lifter described below. The legs and cross piece of the H-shaped platform 40 are preferably made of tubular box steel. Vertical steel safety plates 44 are screwed or bolted to platform 40 to keep hands or objects from the guide channels when the platform moves up and down. Four rollers 48 with axles welded to the legs of platform 40 for rotation within channel members 14 provide for guided, frictionless movement of lifting member 38 within frame 12. Cable securing eye pieces 46 are welded to the upper axles.

A box steel pulley mounting bar 50 is mounted to the tractor standard drawbar 52 and secured by rod 54 and lock pin 56. Rod 54 upper end comprises an eye 58 for coupling to a lifting assist hydraulic cylinder 59 described below. Channel member 53 welded to pin 54 fits over draw bar 52 when installed to keep cylinder 59 from rotating. A pair of pulleys 60 are mounted near the ends of bar 50 in the same plane with pulleys 62 mounted to member 16 of frame 12. In a preferred embodiment, bar 50 comprises a box steel member with pulleys 60 mounted internally for safety reasons. See FIG. 8. Member 50 is free to rotate about pin 54, which enables cables 64 to seek force equilibrium during operation.

As better seen in FIG. 1, cables 64 having one of their ends secured to eye pieces 46, extend upward and around pulley 62, then downward and around pulleys 60, then upward and have their other ends secured to eye pieces 19 of bottom member 18 of frame 12. It will be understood that when the operator selectively raises and lowers the tractor 3-point hitch, frame member 12 is raised and lowered, respectively. When bottom member 18 rises, tension forces are applied to cables 64 because pulleys 60 are fixed with respect to draw bar 52 and the tractor frame. These forces are transferred into cable lifting forces at the opposite ends of the cable which are secured to openings of eye pieces 46 of platform 38. Thus, if the 3-point hitch raises frame 12 one foot, cable 64 will, in response, raise platform 40 two feet, relative to member 18, for a total lift of 3 feet.

Bale lifting spear assembly includes a spear mount 68 comprising plate 70 having three openings 72 for matching three of the center openings 42 of lift member 38 and receiving mounting bolts as desired. A mounting tube 74 has one end welded to plate 70 and is strengthened for vertical lift by angle plate 76 welded to its underside and to plate 70. Elongated spear 78 has one end flat and the other pointed for bale thrusting and defines opening 80 that aligns with mounting opening 82 in tube 74. These openings cooperate to receive a mounting bolt or pin to secure the assembly.

In the event the lifter is to be used to lift jumbo bales, bolt 61 can be inserted through the piston opening of piston rod 63 of cylinder 59 and through flanges 65 on member 24. The other end of cylinder 59 is pin mounted to pin 54 and eye piece 58. Both cylinders 30 and 59 have hydraulic lines (not shown) coupled to the tractor hydraulic drives for selective operation by the operator in the standard manner. Lock pins can be provided for releasably securing the mounting pins for secure but quick release installation and removal of cylinder 59, as desired.

Figure 12:
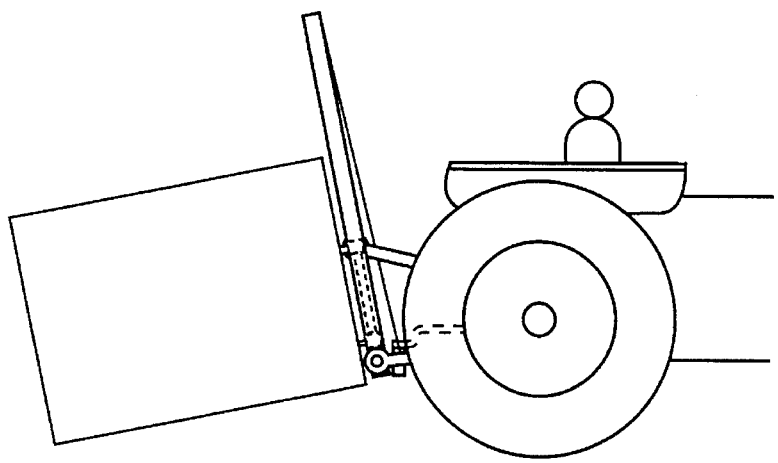
Figure 13:
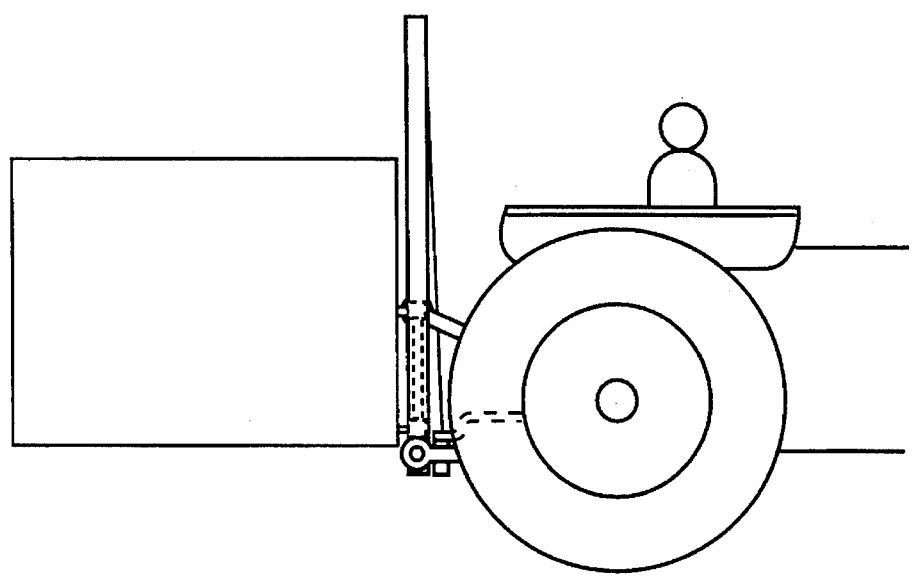
Figure 14:
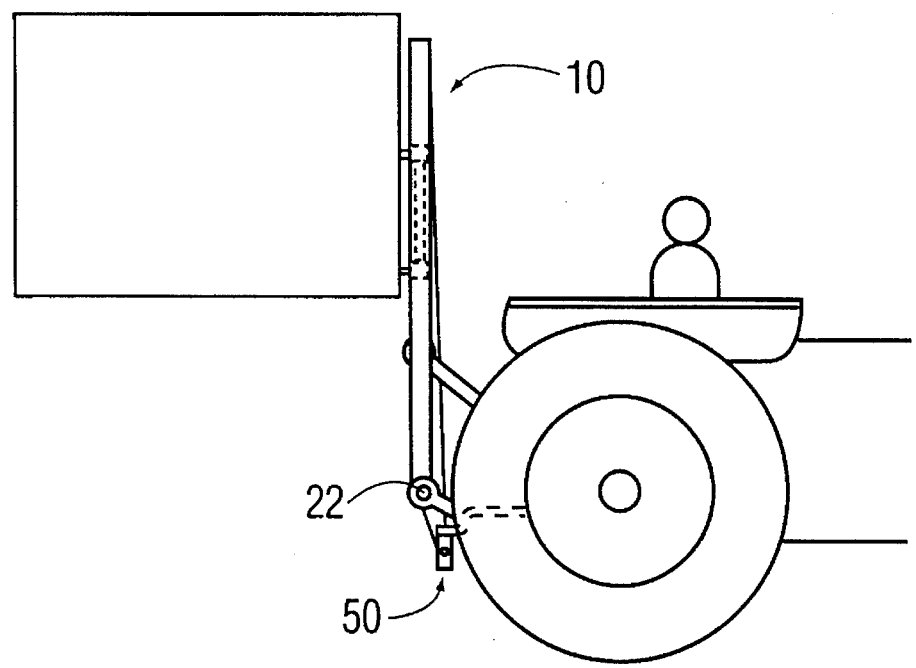

In operation (FIGS. 9–14), the operator approaches the flat end of a bale lying on the ground surface preferably with the spear generally aligned with the vertical plane through the center axis of the bale. The operator tilts the lifter frame 12 from the vertical toward the bale, thus pointing spear 78 and two studs 79 slightly downward. The tractor then moves rearward, to insert or ram fully the spear 78 and the two studs 79. See FIG. 12. Once fully inserted, the operator actuates cylinder 30 to rotate frame 12 to the near vertical position or slightly beyond the vertical. This action raises bale 5 slightly above the ground surface (FIG. 13). Once confident about the security of the engagement, the operator actuates the hydraulic lift of the tractor 3-point hitch which raises frame 12 and platform 38 as described above (FIG. 14). In one embodiment, the center of the bale is lifted to a height of approximately 8 feet 6 inches above ground surface.

The operator now can drive to a flat-bed, barn or other deposit zone and deliver the bale as desired. If desired, the operator can tilt the frame and spear slightly downward to assist in withdrawing the spear. Then or with the bale horizontal, the frame is lowered until the bale is supported on the raised surface or a layer of other bales. The operator then drives the tractor forward to withdraw the spear.

Delivering to a ground surface is simply achieved by lowering the 3-point hitch, frame 12, and platform 38 to their bottom positions, tilting frame 12 off the vertical to lower spear 78 so that the free end of the bale rests on the ground, and then driving the tractor forward to withdraw the spear.

In the event jumbo bales are to be lifted, even by small tractors, the operator would first install the optional lift assist cylinder 59 and connect the hydraulic lines to the tractor hydraulic drive couplings. Cylinder 59 is then operated when the 3-point hitch is operated to raise or lower the lifting mechanism. The power of cylinder 59 then augments the lifting power of cables 64.

It will be understood that the various parts and members should be made of materials and dimensioned to accommodate the weights and stresses expected to be encountered together with added degrees of margin for safety and reliability. In one embodiment, capable of lifting jumbo bales (about 1600–2000 pounds), parts comprised the following:

| Ref. No | |
| --- | --- |
| 14 | 3" × 2" Steel Channel 7# per ft; 78" Length |
| 18 | 3" × 2" Steel Channel 7# per ft; 26" Length |
| 16 | 3" × 2" Steel Tubing; 26" Length |
| 64 | ¼" 7000 W.P. Steel Cable |
| 54 | 1" Dia. Rod with Lock Pin |
| 48 | 2 ¼" Tapered Rollers |
| 24 | 3" × 3" Steel Angle |
| 61 | 1" Steel Rod |
| 70, 76 | ½" Steel |
| 38, | 3" × 3" Steel Box Tubing |
| 74 | 1 ½" Sch. #80 Pipe; 1 ½" inside Dia.; 13" Length |
| 78 | 1 ½" Dia. Drill Steel; 42–48" Length |

-continued

| Ref. No | |
|---|---|
| 79 | 1 ⅛" Dia. Steel; 15" Length |
| 30 | 8" Stroke, 20 ¼" Closed Length Hydraulic Cylinder |
| 59 | 24" Stroke, 34 ¼" Closed Length Hydraulic cylinder |

It will be understood that various changes, modifications, and improvements can be made to the herein disclosed exemplary embodiments without departing from the spirit and scope of the present invention. It should also be understood that other tool assemblies can be substituted for the spear and stud assembly and mounted on the platform 40 for other types of applications.

I claim:

1. An apparatus for lifting, lowering and placing bales of hay, which apparatus is adapted to be mounted on a tractor having lower arms of a three point hitch powered by the tractor engine, said apparatus comprising, a longitudinal frame member having at least one coupling member for coupling to and being supported by at least one lower arm of the tractor three point hitch and having a second coupling member for coupling to the top link tractor mount of the tractor three point hitch for positioning the frame member in a generally upright position with respect to the tractor, a platform member mounted on said frame member for guided movement in the longitudinal direction of said frame member, at least one force applying member coupled to said platform for raising and lowering said platform relative to said frame member in response to the tractor three point hitch lower arm raising and lowering said frame member, a bale engaging assembly coupled to said platform, said second coupling member comprises an assembly having a length variable under the control of the tractor operator for rotating said frame member to a number of angular positions within the vertical center plane of the tractor, and wherein said at least one force applying member comprises at least one cable having a first end for being fixed relative to said frame member and a second end for being coupled to said platform, said apparatus further comprising cable guide members positioned to cause said cable to raise and lower said platform relative to said frame member in response to the respective raising and lowering of said frame member by the tractor lower arm.

2. An apparatus according to claim 1, wherein said cable guide members comprises a pulley mounting bar assembly for being coupled to the tractor draw bar and having at least one pulley for guiding said at least one cable, and at least one further pulley coupled to said frame member near the top of said frame member for guiding said at least one cable.

3. An apparatus according to claim 1, wherein said bale engaging assembly comprises a mounting member for being detachably coupled to said platform, a spear mount connected to said mounting member for detachably securing a spear in a position extending rearward of said frame member.

4. An apparatus according to claim 3, wherein said mounting member comprises at least one stabilizing stud spaced from said spear mount and for extending rearward from said frame member.

5. An apparatus according to claim 1, wherein said assembly comprises a hydraulic cylinder having one end for coupling to the top link tractor mount of the tractor three point hitch and having its other end for coupling to said frame member at a location which is longitudinally displaced from said at least one coupling member.

6. An apparatus according to claim 5, wherein said frame member comprises a generally rectangular shape with top and bottom legs shorter than the upstanding legs, said upstanding legs comprising guide channels, and said platform member having guide rollers for riding in said guide channels.

7. An apparatus for lifting, lowering and placing bales of hay, which apparatus is adapted to be mounted on a tractor having lower arms of a three point hitch powered by the tractor engine, said apparatus comprising, a longitudinal frame member having at least one coupling member for coupling to and being supported by at least one lower arm of the tractor three point hitch and having a second coupling member for coupling to the top link tractor mount of the tractor three point hitch for positioning the frame member in a generally upright position with respect to the tractor, a platform member mounted on said frame member for guided movement in the longitudinal direction of said frame member, at least one force applying member coupled to said platform for raising and lowering said platform relative to said frame member in response to the tractor three point hitch lower arm raising and lowering said frame member, a bale engaging assembly coupled to said platform, and wherein said apparatus further comprises a lift assist device for assisting said one force applying member, said device having one end for being coupled to the tractor and having a second end for being coupled to said frame member and for being selectively powered by the tractor engine under the control of the operator.

8. An apparatus according to claim 7, wherein said device comprises an hydraulic cylinder having said one end for being coupled to the tractor draw bar.

9. A method of engaging, lifting, moving and depositing a cylindrical bale of hay with the use of a spear mechanism mounted on the lower arms of a tractor three point hitch and powered by the tractor, the method comprising:

tilting the spear below the horizontal, inserting the spear into the approximate center axis of the bale such that one end of the bale is adjacent the ends of said lower arms, moving the spear to at or near the horizontal so that substantially all the weight of the bale is supported by the spear, raising the lower arms, and raising the spear and the bale in a substantially vertical direction to a desired height in response to and in a multiple greater than two relation to the raising of the ends of the lower arms.

10. A method according to claim 9, further comprising, moving the tractor to a desired location, lowering the spear in a genrally vertical direction until the weight of the bale is substantially supported by other than the spear, and driving the tractor away from the bale to withdraw the spear.

11. A method according to claim 10, further comprising titling the spear downward prior to said driving step to assist the withdrawal of the spear from the bale.

* * * * *